UNITED STATES PATENT OFFICE.

THOMAS A. EDISON, OF LLEWELLYN PARK, WEST ORANGE, NEW JERSEY, ASSIGNOR TO THOMAS A. EDISON, INCORPORATED, OF WEST ORANGE, NEW JERSEY, A CORPORATION OF NEW JERSEY.

COMPOSITION FOR SOUND-RECORDS AND OTHER OBJECTS.

1,002,505.  Specification of Letters Patent.  Patented Sept. 5, 1911.

No Drawing.  Application filed January 27, 1911. Serial No. 604,925.

*To all whom it may concern:*

Be it known that I, THOMAS A. EDISON, a citizen of the United States, and a resident of Llewellyn Park, West Orange, Essex county, New Jersey, have invented a certain new and useful Composition for Sound-Records and other Objects, of which the following is a description.

My invention relates to a new composition of matter especially adapted for use as a substance from which phonograph or talking machine records may be made, and for the production of other objects in which similar characteristics are required.

The object of my invention is to produce a composition composed of the ingredients and having the characteristics which will be more fully set forth in the following specification and appended claims.

According to my invention, a hard solid body is formed consisting of a hard resinous substance with which is combined a felted or matted mass of crystals of a substitution product of an aromatic hydrocarbon uniformly distributed through the resinous substance. Preferably, the resinous body is shellac and the felted mass of crystals is composed of tetra-chloronaphthalene.

In practice, the tetra-chloronaphthalene is melted, and shellac in powdered form is gradually added, while the melted liquid is being agitated by a stirrer. Or a powder containing the tetra-chloronaphthalene and shellac in proper proportions may be gradually added to a liquid of the same composition which is being agitated. The tetra-chloronaphthalene should be in approximately the proportion of one-fourth of the shellac by weight, although a less proportion of tetra-chloronaphthalene may be used. When the substance cools and solidifies, the tetra-chloronaphthalene will be found distributed through the mass in crystalline form, the crystals being felted or matted together. In forming a sound record, the liquid composition should be constantly agitated to prevent the segregation of the tetra-chloronaphthalene, and may be flowed or otherwise located upon a desired surface or in the desired shape and there allowed to harden. A composition such as described retains all the hardness of shellac, but has a greater toughness and elasticity than shellac and other qualities desirable in a composition for the formation of sound records. The toughness is largely due to the felted structure of crystals or tetra-chloronaphthalene in the shellac. It may be remarked that tetra-chloronaphthalene has perhaps the most powerful tendency to crystallize of any organic substance.

The term "tetra-chloronaphthalene" is a trade designation for a product formed by the chlorination of naphthalene, which crystallizes as a felt of flexible, fibrous crystals. It apparently is a mixture of various chlorin substitution products of naphthalene, probably the tri-, tetra-, and penta-chloronaphthalenes, having substantially the same average composition as tetra-chloronaphthalene. I have also found that di-nitro-benzene and di-nitro-toluene may be used as substitutes for the tetra-chloronaphthalene in substantially the same proportions and with similar results.

If desired, a fibrous or filling body of well known character, such as asbestos, cotton flock, etc., may be incorporated with the composition.

Having now described my invention, what I claim and desire to protect by Letters Patent is as follows:—

1. As a new composition of matter, shellac and a halogenized naphthalene crystallizing as fibers distributed through the shellac, substantially as described.

2. As a new composition of matter, shellac and a felted mass of fibrous crystals of a halogenized naphthalene distributed through the shellac, substantially as described.

3. As a new composition of matter, shellac and crystallized tetra-chloro-naphthalene distributed through the same, substantially as described.

4. As a new composition of matter, shellac and a higher chlorin substitution product of naphthalene in crystalline form distributed through the same, substantially as described.

5. As a new composition of matter, shellac and a higher chlorin substitution product of naphthalene distributed through the same, and in the proportion of not more than one-fourth the shellac, by weight, substantially as described.

6. As a new composition of matter, shellac and a felted mass of crystals of a substitution product of an aromatic hydrocarbon distributed through the same, substantially as described.

7. As a new composition of matter, a hard resin and a felted mass of crystals of a substitution product of an aromatic hydrocarbon distributed through the same, substantially as described.

This specification signed and witnessed this 25th day of January 1911.

THOMAS A. EDISON.

Witnesses:
 DYER SMITH,
 ANNA R. KLEHM.

Copies of this patent may be obtained for five cents each, by addressing the "Commissioner of Patents, Washington, D. C."